United States Patent [19]

Morgan et al.

[11] 4,354,592
[45] Oct. 19, 1982

[54] SELF-CLEANING APPARATUS FOR REMOVING MATERIAL FROM A ROTATING DRUM

[75] Inventors: Allan C. Morgan, Chesterfield; Dan K. Puckett, St. Charles, both of Mo.

[73] Assignee: Cabot Corporation, Kokomo, Ind.

[21] Appl. No.: 175,993

[22] Filed: Aug. 7, 1980

[51] Int. Cl.³ .............................................. B65G 17/36
[52] U.S. Cl. ................................................... 198/703
[58] Field of Search ...................... 198/702, 705, 703; 195/497, 498, 499; 222/342, 145

[56] References Cited

U.S. PATENT DOCUMENTS 3,952,757  4/1976  Huey .................................... 222/342

FOREIGN PATENT DOCUMENTS 157835   1/1953  Australia ............................. 198/705
78234  11/1894  Fed. Rep. of Germany ...... 198/703

Primary Examiner—John J. Love
Assistant Examiner—Brian Bond
Attorney, Agent, or Firm—Jack Schuman; Robert F. Dropkin

[57] ABSTRACT

Self-cleaning apparatus for removing material from a rotating drum. Buckets are associated with a scraper which is maintained in a substantially fixed position relative to the local gravitational force vector. The scraper is maintained in said position by means of a counterweight. A scraping action is achieved as the drum and buckets rotate.

6 Claims, 6 Drawing Figures

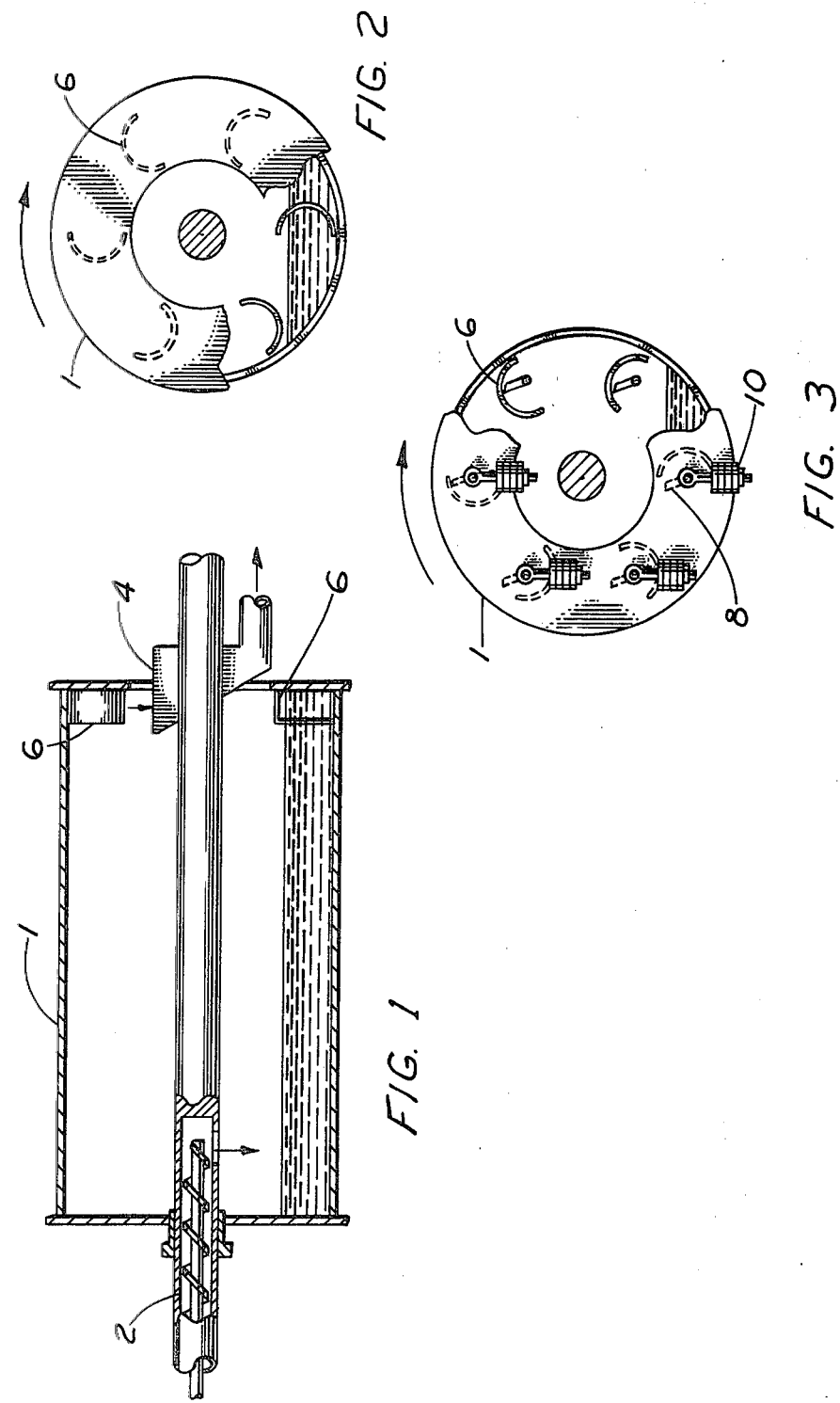

SELF-CLEANING APPARATUS FOR REMOVING MATERIAL FROM A ROTATING DRUM

The present invention relates to apparatus for removing material from a rotating drum, and in particular, to self-cleaning apparatus for removing material from a rotating drum.

Buckets used to lift sticky material from a rotating drum, such as carbon black with added oil, often become clogged and as a result thereof useless as lifting devices. The drum must then be shutdown to scrape the buckets and render them useful again. These shutdowns are both costly and time consuming.

Through the present invention there are provided buckets with a self-cleaning mechanism. The buckets are associated with a scraper which is maintained in a substantially fixed position relative to the local gravitational force vector. The scraper is maintained in said position by means of a counterweight. A scraping action is achieved as the drum and buckets rotate.

Various self-cleaning mechanisms ae disclosed in U.S. Pat. Nos. 2,102,054; 2,120,540; 2,327,016; 2,758,824; 3,845,940 and 3,988,144. None of them disclose the apparatus of the present invention. None of them disclose a scraper maintained in a substantially fixed position relative to the local gravitational force vector.

It is accordingly an object of the present invention to provide self-cleaning apparatus for removing material from a rotating drum.

The foregoing and other objects of the present invention will be best understood from the following description, reference being had to the accompanying drawings wherein:

FIG. 1 is a longitudinal view in section of a rotating drum in accordance with the present invention;

FIG. 2 is an end view in section of the rotating drum of FIG. 1;

FIG. 3 is an end view in section of the rotating drum of FIG. 1, with the self-cleaning mechanism;

Figure 4:
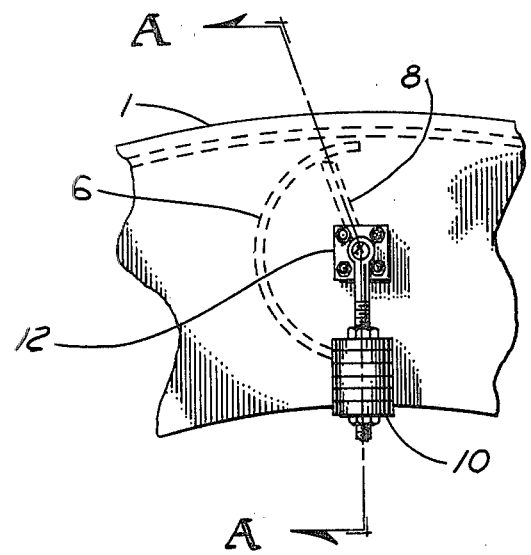
FIG. 4 is an enlarged end view in section of one of the buckets and associated scraper and counterweight.

The present invention provides self-cleaning apparatus for removing material from a rotating drum. The apparatus is comprised of means through which material enters the drum, means through which material leaves the drum, at least one bucket for lifting material and depositing it in the exiting means and means for cleaning the bucket without stopping the rotation of the drum. The bucket is affixed to rotate with the drum. The cleaning means is comprised of scraping means which are maintained in a substantially fixed position relative to the local gravitational force vector. A counterweight is used to so maintain the scrapping means. All of this is described in greater detail hereinbelow, with reference to the Figures.

FIG. 1 is a longitudinal view in section of the rotating drum. Shown therein are drum 1, screw conveyor 2 for supplying drum 1 with material, hopper 4 for receiving material which is to be removed from drum 1, and buckets 6 for lifting material and depositing it in hopper 4.

FIG. 2 in an end view in section of the rotating drum of FIG. 1. FIG. 3 is the same as FIG. 2 with the self-cleaning mechanism of the present invention. Shown in FIG. 2 are drum 1 and buckets 6. Additionally shown in FIG. 3 are scrapers 8 and counterweights 10. The buckets are substantially semi-circular in shape. Their particular arrangement is dependent upon the direction in which the drum is rotating.

FIG. 4 is an enlarged end view in section of one of the buckets 6 and associated scraper 8 and counterweight 10. Also shown therein are drum 1 and bearing housing 12.

Figure 5:
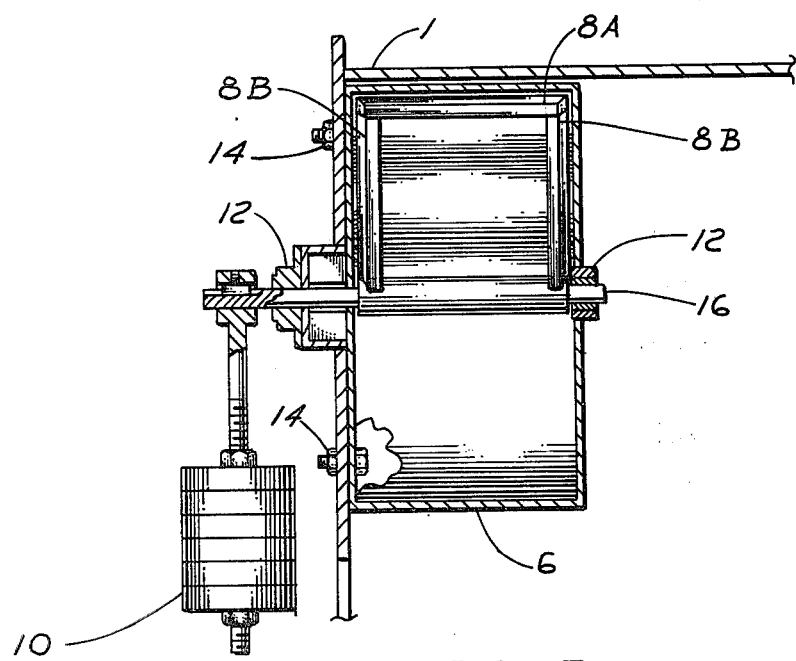
FIG. 5 is a detailed view along line A—A of FIG. 4.

FIG. 5 is a detailed view along line A—A of FIG. 4. Shown therein are drum 1, bucket 6, scraper 8 shown as 8A for use against the bottom of the bucket and 8B for use against the sides of the bucket, counterweight 10, bearing housings 12, bolts 14 for fastening bucket 6 to drum 1 and shaft 16 for connecting scraper 8 and counterweight 10. Scraper 8 and counterweight 10 are fixedly mounted to shaft 16. Shaft 16 is free to rotate.

Figure 6:
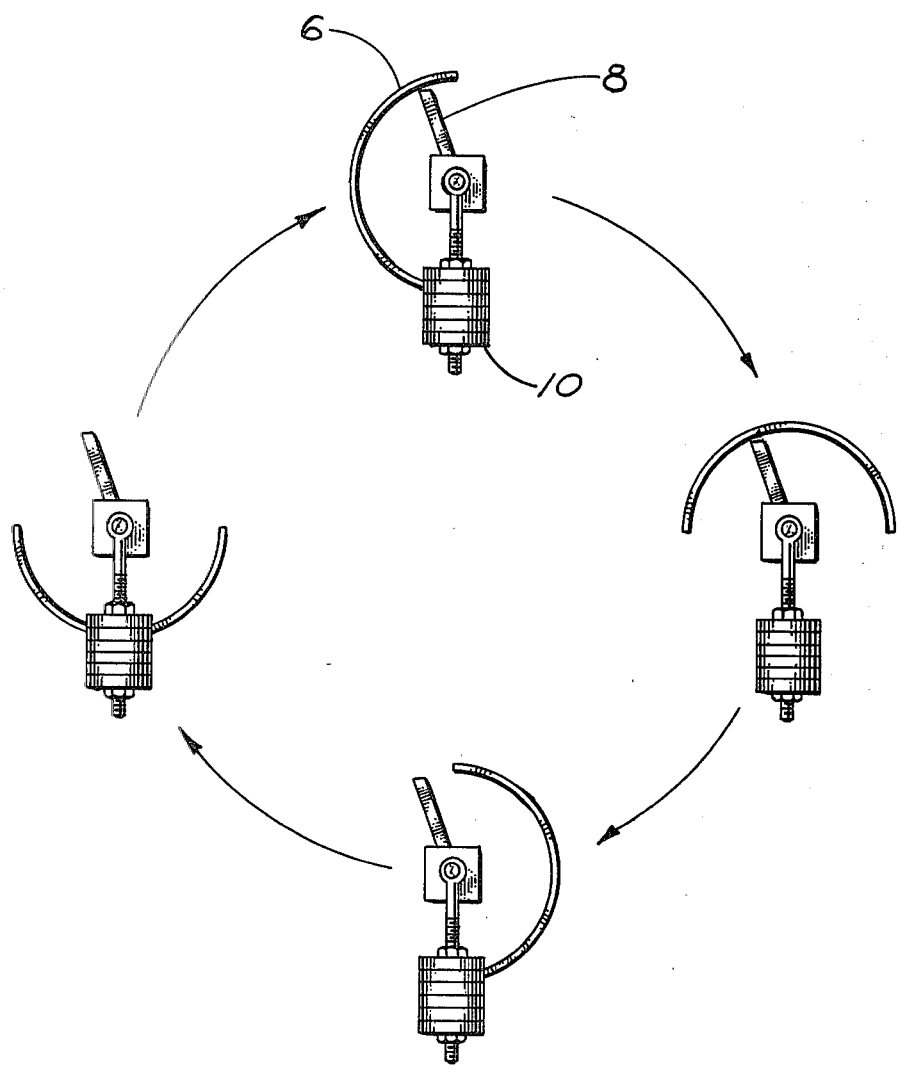
FIG. 6 is a schematic end view showing the relationship between the buckets and scrapers during rotation.

FIG. 6 is a schematic end view showing the relationship between buckets 6 and scrapers 8 during rotation. The fact that four buckets are shown as contrasted to the six in FIGS. 2 and 3 is not significant. The invention is not dependent upon the number of buckets.

Modifications of the structure depicted in FIGS. 1—6 are within the scope of the invention. For example, the scraping means need not be adapted for use against the side of the bucket as shown in FIG. 5. In certain instances it is sufficient to scrape only the bottom of the bucket. The scraping means can also be constructed so as to include the counterweight as an integral part thereof. In such an embodiment shaft 16 does not pass through drum 1 as shown in FIG. 5. Likewise, screw conveyor 2 and hopper 4 may be respectively replaced by alternative inlet and outlet means which are well known to those skilled in the art.

It will be apparent to those skilled in the art that the novel principles of the invention disclosed herein in connection with specific examples thereof, will suggest various other modifications and applications of the same. It is accordingly desired that in construing the breadth of the appended claims they shall not be limited to the specific examples of the invention described herein.

We claim:

1. Apparatus for removing material from a rotating drum comprising means through which material enters said drum, means through which material leaves said drum, at least one bucket for lifting material and depositing it in said means through which material leaves said drum, said bucket being affixed to rotate with said drum, means for cleaning said bucket without stopping the rotation of said drum, said cleaning means being comprised of scraping means, and means for maintaining said scraping means in a substantially fixed position relative to the local gravitational force vector.

2. Apparatus according to claim 1, wherein said scraping means is maintained in a substantially fixed position relative to the local gravitational force vector by a counterweight.

3. Apparatus according to claim 2, wherein said scraping means and counterweight are connected by a shaft passing through said bucket and drum.

4. Apparatus according to claim 2, wherein said bucket has a substantially semi-circular configuration.

5. Apparatus according to claim 2, wherein said scraping means includes means to scrape the sides of said bucket.

6. Apparatus according to claim 1, having several buckets for lifting material and depositing it in said means through which material leaves said drum, and means for cleaning each of said buckets without stopping the rotation of said drum, each of said buckets being affixed to rotate with said drum.

* * * * *